US012529447B2

(12) United States Patent
Winfrey

(10) Patent No.: US 12,529,447 B2
(45) Date of Patent: Jan. 20, 2026

(54) BRACKET APPARATUS FOR POLE RETENTION AND ITEM DISPLAY

(71) Applicant: David Winfrey, Bentonville, AR (US)

(72) Inventor: David Winfrey, Bentonville, AR (US)

( * ) Notice: Subject to any disclaimer, the term of this patent is extended or adjusted under 35 U.S.C. 154(b) by 0 days.

(21) Appl. No.: 18/045,944

(22) Filed: Oct. 12, 2022

(65) Prior Publication Data

US 2024/0125428 A1 Apr. 18, 2024

(51) Int. Cl.
*G09F 15/00* (2006.01)
*F16M 13/02* (2006.01)

(52) U.S. Cl.
CPC ......... *F16M 13/02* (2013.01); *G09F 15/0037* (2013.01)

(58) Field of Classification Search
CPC ..... G09F 7/18; G09F 15/0037; Y10T 24/3924
USPC ... 248/682, 686, 219.4, 219.3, 218.4, 219.1, 248/230.1, 309.1; 40/607.03, 607.01, 40/299.01, 316, 334; 206/379, 485, 806
See application file for complete search history.

(56) References Cited

U.S. PATENT DOCUMENTS 2,225,822 A * 12/1940 Crook ................ B65D 71/0037 206/168
2,882,629 A * 4/1959 Moebius ................... G09F 1/14 40/607.1
3,199,669 A * 8/1965 Straus ....................... B01L 9/06 422/522
3,470,641 A 10/1969 Meyer
3,638,894 A 2/1972 Leutenegger
3,752,902 A * 8/1973 Wilson ................. H01B 17/145 174/163 F
4,023,678 A * 5/1977 Fiedler ...................... A61F 6/14 206/476
4,133,427 A * 1/1979 Loomis ................. F42B 39/007 206/820
4,168,423 A * 9/1979 Gilreath .................... F24C 7/06 24/336
4,259,803 A 4/1981 Sittler
4,738,041 A 4/1988 Drueck, Jr.
5,231,735 A * 8/1993 Paxton ............... B65D 33/1625 24/30.5 S
5,533,239 A * 7/1996 Gall ........................ E04C 5/167 24/339
5,881,517 A 3/1999 Prince et al.
6,212,810 B1 4/2001 Jones
8,052,108 B2 * 11/2011 Ahn ......................... A61B 8/00 248/314

(Continued)

*Primary Examiner* — Alfred J Wujciak

(57) ABSTRACT

A bracket apparatus for pole retention and item display to a pole or anchoring a pole to a support structure includes a support panel and at least one pole attachment. The pole attachment includes a top attachment flap and a bottom attachment flap and is foldably integrated to the support panel. The top attachment flap and the bottom attachment flap each includes a main body, a distal edge, a connector edge, and at least one pole-retaining channel. The pole-retaining channel traverses through the main body as the main body of top attachment flap and the bottom attachment flap are foldably connected to the support panel via the connector edge. The connector edges of the top attachment flap and the bottom attachment flap are linearly offset from each other thus allowing both flaps to be folded towards each other. An elongated pole can then be inserted through the pole-retaining channels.

9 Claims, 11 Drawing Sheets

(56) References Cited

U.S. PATENT DOCUMENTS

| | | | |
|---|---|---|---|
| 8,371,614 | B2 | 2/2013 | Rodriguez |
| 8,713,829 | B1 | 5/2014 | Crofford |
| 10,323,424 | B2 | 6/2019 | Young |
| 2005/0108719 | A1 | 5/2005 | Need et al. |
| 2017/0092163 | A1 | 3/2017 | Hlavin |

* cited by examiner

BRACKET APPARATUS FOR POLE RETENTION AND ITEM DISPLAY

FIELD OF THE INVENTION

The present invention is a bracket apparatus for pole retention and item display to a pole for anchoring a pole to a surface. More specifically, the present invention enables a flat-surface display item to be mounted to an elongated pole body through an integrated bracket apparatus, and similarly enables an elongated pole with display to be anchored to a fixed surface such as a window, wall, or other support structure.

BACKGROUND OF THE INVENTION

Display signs, paintings, and other similar flat display items are generally mounted to an elongated pole via adhesive, staples, tapes, and other similar types of fastening mechanisms. Due to the material differences of the display item and the elongated pole, the attachment between the aforementioned items tend to fail thus resulting the user to intermittingly fix the attachment between the display item and the elongated pole. Furthermore, users generally have to buy or source the aforementioned fastening mechanism which generally results in additional expenses and time. Additionally, existing fastening mechanisms between the display signs and poles do not provide a clean attachment. For example, staples that normally go through the display item are visible from the front side and distract from the displayed message. Any types of tapes that are generally attached from the non-display surface of the display item create a cluttered and unattractive surrounding. A similar dynamic exists when attempting to anchor a pole, for the display of an item such as a flag, pennant, or banner, to a support structure where penetration of the support structure is either undesirable or infeasible.

It is therefore an objective of the present invention to provide a mounting bracket apparatus for a display item. The present invention can be easily attached to a fixed or upright pole without having to utilize additional fastening mechanisms. More specifically, the front side of the present invention functions as a mounting surface so that the display item can be easily attached or alternatively, so that the mounting surface can be securely attached to a support structure such as a window or wall. The rear side of the present invention has integrated securing flaps that allow an elongated pole to be inserted through such flaps so that the present invention can be readily mounted to the elongated pole.

DETAIL DESCRIPTIONS OF THE INVENTION

All illustrations of the drawings are for the purpose of describing selected versions of the present invention and are not intended to limit the scope of the present invention.

Figure 1:
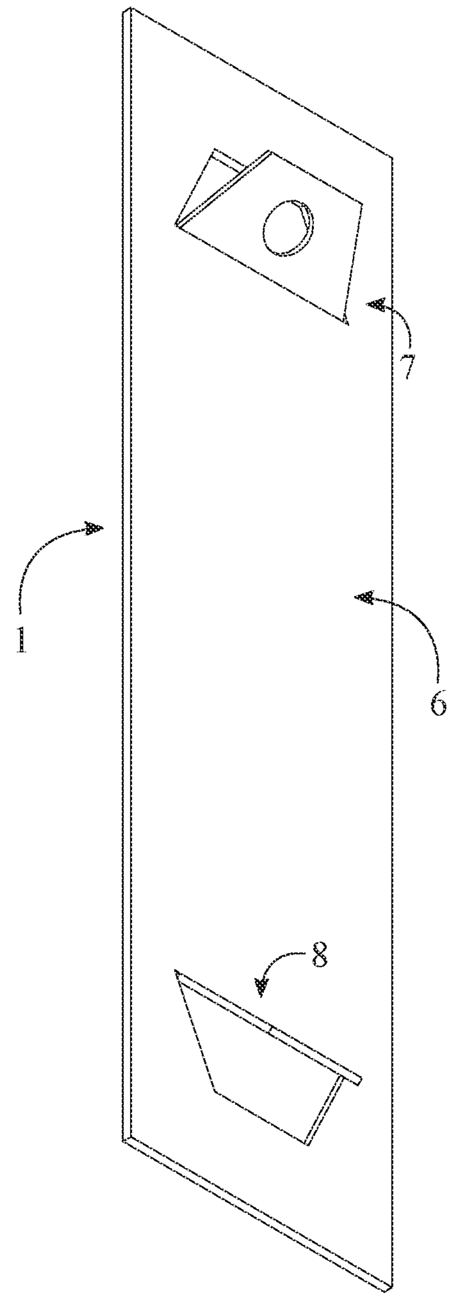
FIG. 1 is a bottom-rear perspective view of the first configuration of the present invention.
Figure 2:
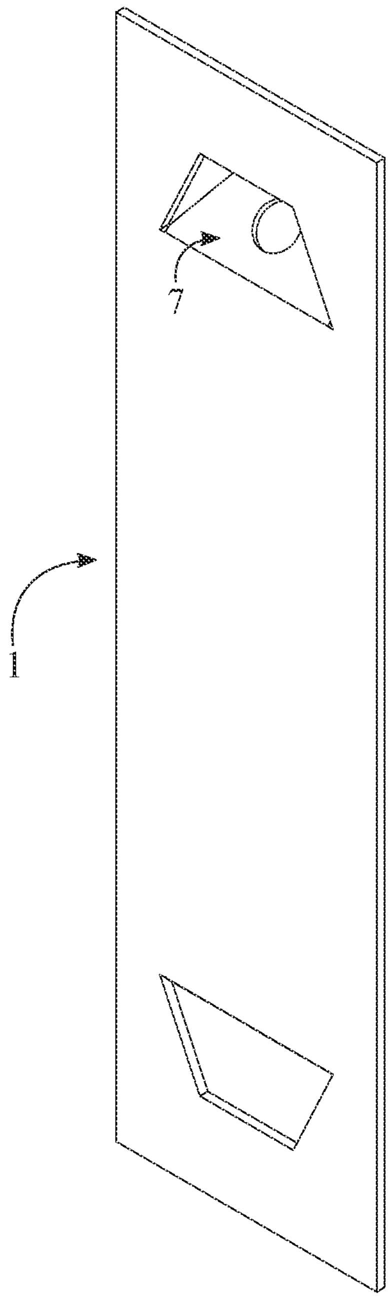
FIG. 2 is a front-top perspective view of the first configuration of the present invention.

The present invention is a bracket apparatus for pole retention and item display to a pole for anchoring a pole to a support structure so that the present invention can easily attach the display item to a fixed or upright pole or anchor a pole to a support structure without having to utilize additional mounting components. In other words, the present invention functions as the intermediate mounting mechanism between the display item and the fixed or upright pole so that the display item can be securely mounted to the pole. The present invention similarly functions as the intermediate mounting mechanism between a pole and a support structure such as wall and window. The present invention comprises a support panel 1 and at least one pole attachment 6 as shown in FIG. 1 and FIG. 2. In reference to general configuration of the present invention, the at least one pole attachment 6 is foldably integrated toward a rear surface of the support panel 1 thus allowing an elongated pole to be inserted through. A front surface of the support panel 1 can then be utilized to secure the display item that demonstrates the preferred message of the user.

In reference to FIGS. 1-11, the support panel 1 is preferably formed into a rectangular shape to maximize the adhering surface area. However, the support panel 1 can also be formed into any other type of geometric shape or organic shape upon user requests. Furthermore, the front surface of the support panel 1 provides a clean and flat surface area so that support panel 1 can securely mount to the back of the display item or a support structure. Furthermore, the rectangular shape of the support panel maintains a flat surface area for the display item so that the demonstrate message can be clearly shown as the outer shape of the elongated pole does not interfere with the display item.

Figure 3:
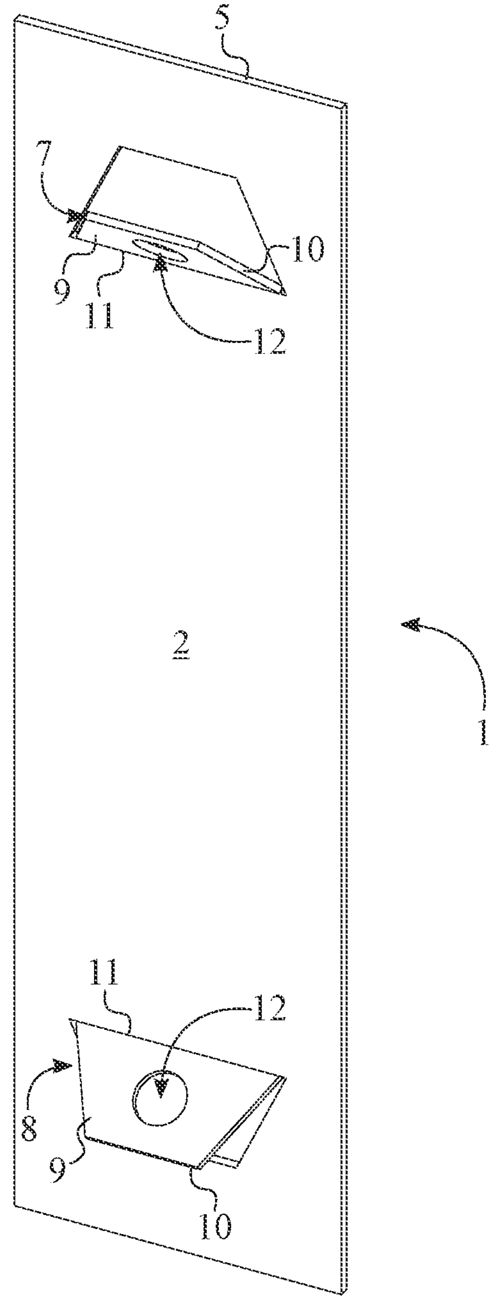
FIG. 3 is a bottom-top perspective view of the first configuration of the present invention, showing the central channel of the at least one pole-retaining channel.

In reference to FIG. 3, the at least one pole attachment 6 comprises a top attachment flap 7 and a bottom attachment flap 8 so that the elongated pole can be inserted along the length or the height of the support panel 1. The top attachment flap 7 and the bottom attachment flap 8 are foldably integrated to the support panel 1 and each comprises a main body 9, a distal edge 10, a connector edge 11, and at least one pole-retaining channel 12. More specifically, the main body 9 of the top attachment flap 7 is foldably connected to the support panel 1 along the connector edge 11 of the top attachment flap 7 so that the top attachment flap 7 can be angularly folded about the connector edge 11. The main body 9 of the bottom attachment flap 8 is foldably connected to the support panel 1 along the connector edge 11 of the bottom attachment flap 8 so that the bottom attachment flap 8 can be angularly folded about the connector edge 11. Furthermore, the connector edge 11 of the top attachment flap 7 and the connector edge 11 of the bottom attachment flap 8 are linearly offset from each other so that the elongated pole can sufficiently support the support panel 1. The at least one pole-retaining channel 12 traverses through the main body 9 and positioned within the distal edge 10 and the connector edge 11. In other words, the at least one pole-retaining channel 12 of the top attachment flap 7 traverses through the main body 9 of the top attachment flap 7 and positioned within the distal edge 10 and the connector edge 11 of the top attachment flap 7. The at least one pole-retaining channel 12 of the bottom attachment flap 8 traverses through the main body 9 of the bottom attachment flap 8 and positioned within the distal edge 10 and the connector edge 11 of the bottom attachment flap 8. As a result, the elongated pole can be inserted through the at least one pole-retaining channel 12 of the top attachment flap 7 and the at least one pole-retaining channel 12 of the bottom attachment flap 8. Then, the angular positionings of the top attachment flap 7 and the bottom attachment flap 8 are able to provide sufficient friction against the elongated pole to securely attach the present invention.

In reference to a first configuration of the present invention, the support panel 1 comprises an outer edge 5, a top opening 20, and a bottom opening 21 as shown in FIGS. 1-4. More specifically, the outer edge 5 defines the actual shape of the support panel 1 as the at least one pole attachment 6 is positioned within the outer edge 5. The top opening 20 traverses through the support panel 1 as a sectional-cutout so that the top attachment flap 7 can be defined within the support panel 1. Similarly, the bottom opening 21 traverses through the support panel 1 as a sectional-cutout so that the bottom attachment flap 8 can be defined within the support panel 1. In other words, the distal edge 10 of the top attachment flap 7 is delineated by the top opening 20, and the distal edge 10 of the bottom attachment flap 8 is delineated by the bottom opening 21. As a result, the connector edge 11 of the top attachment flap 7 is linearly extended from a left end 15 of the distal edge 10 to a right end 16 of the distal edge 10. The connector edge 11 of the bottom attachment flap 8 is linearly extended from a left end 15 of the distal edge 10 to a right end 16 of the distal edge 10.

Figure 8:
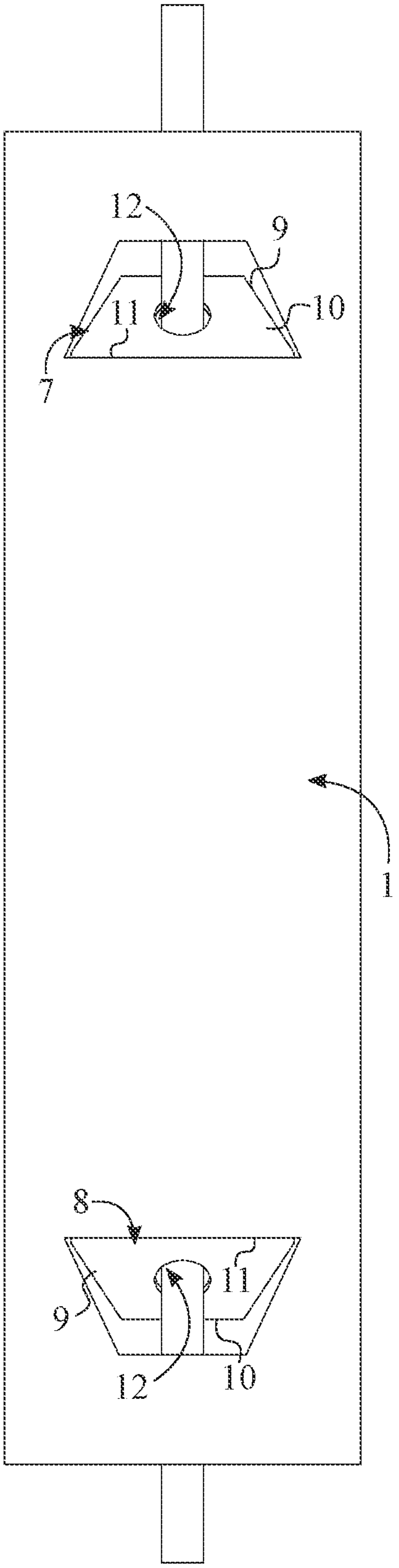
FIG. 8 is a front view of the first configuration of the present invention, showing an elongated pole inserted through the at least one pole-retaining channel of the top attachment flap and the bottom attachment flap.

As shown in FIGS. 1-4, the top attachment flap 7 is foldably positioned within the outer edge 5 as the connector edge 11 of the top attachment flap 7 is foldably connected to the support panel 1. As a result, the distal edge 10 of the top attachment flap 7 is also positioned within the outer edge 5 when the top attachment flap 7 is positioned parallel or angular to the support panel 1. The bottom attachment flap 8 is foldably positioned within the outer edge 5 as the connector edge 11 of the bottom attachment flap 8 is foldably connected to the support panel 1. As a result, the distal edge 10 of the bottom attachment flap 8 is also positioned within the outer edge 5 when the bottom attachment flap 8 is positioned parallel or angular to the support panel 1. When the top attachment flap 7 and the bottom attachment flap 8 are folded at a right angle about the rear surface 2, the at least one pole-retaining channel 12 of the top attachment flap 7 is concentrically positioned with the at least one pole-retaining channel 12 of the bottom attachment flap 8. Then, the user can easily insert the elongated pole through the at least one pole-retaining channel 12 of the top attachment flap 7 and the bottom attachment flap 8 as shown in FIG. 8. Once the elongated pole is inserted through the at least one pole-retaining channel 12 of the top attachment flap 7 and the bottom attachment flap 8, the top attachment flap 7 and the bottom attachment flap 8 fold outward and create an obtuse angle with the rear surface 2 of the support panel 1 that positioned in between the at least one pole attachment 6 thus applying friction between the elongated pole and the present invention to maintain a stationary position.

Figure 6:
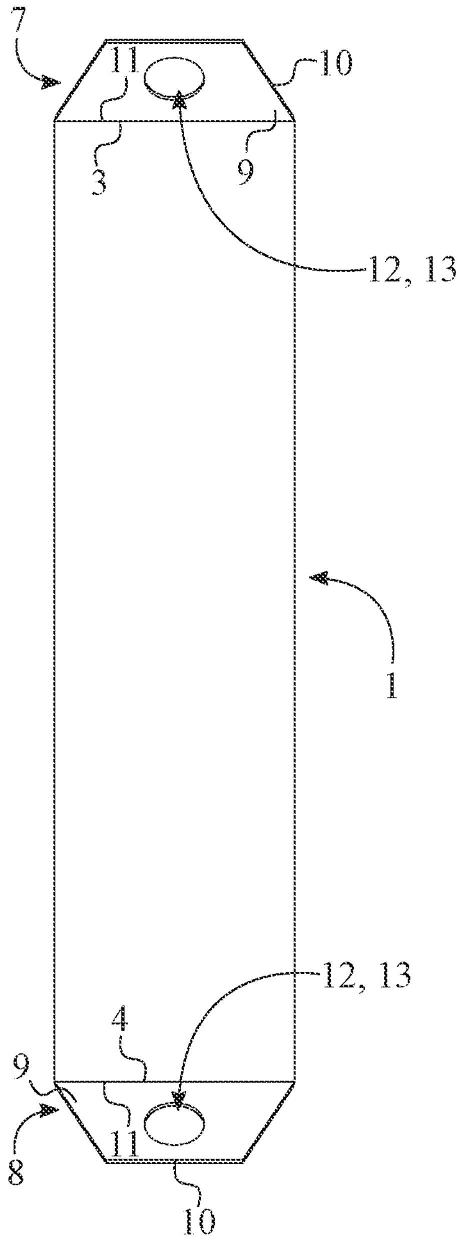
FIG. 6 is a rear view of the second configuration of the present invention, showing the central channel of the at least one pole-retaining channel.
Figure 9:
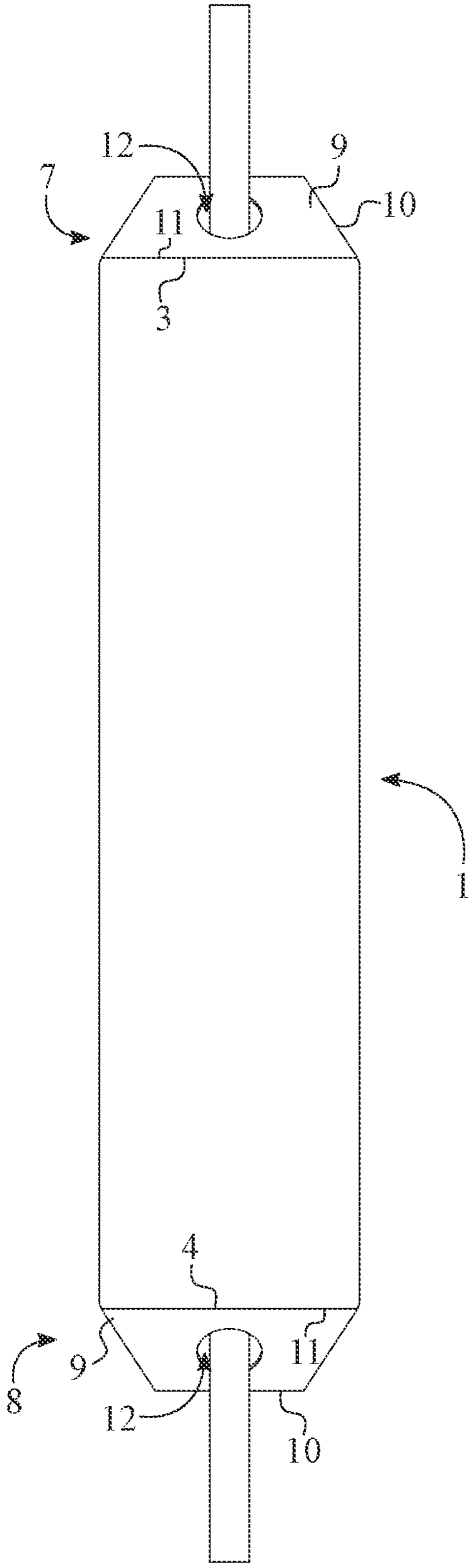
FIG. 9 is a front view of the second configuration of the present invention, showing an elongated pole inserted through the at least one pole-retaining channel of the top attachment flap and the bottom attachment flap.

In reference to a second configuration of the present invention, the support panel 1 comprises a top edge 3 and a bottom edge 4 as shown in FIG. 6. More specifically, the top edge 3 is positioned parallel to the bottom edge 4 as the top edge 3 and the bottom edge 4 delineate the two outermost edges. The top attachment flap 7 is adjacently positioned to the top edge 3 as the connector edge 11 of the top attachment flap 7 is foldably connected to the top edge 3. As a result, the distal edge 10 of the top attachment flap 7 is externally positioned to the top edge 3 and the support panel 1. The bottom attachment flap 8 is adjacently positioned to the bottom edge 4 as the connector edge 11 of the bottom attachment flap 8 is foldably connected to the bottom edge 4. As a result, the distal edge 10 of the bottom attachment flap 8 is externally positioned to the bottom edge 4 and the support panel 1. When the top attachment flap 7 and the bottom attachment flap 8 are folded at a right angle and toward the rear surface 2, the at least one pole-retaining channel 12 of the top attachment flap 7 is concentrically positioned with the at least one pole-retaining channel 12 of the bottom attachment flap 8. Then, the user can easily insert the elongated pole through the at least one pole-retaining channel 12 of the top attachment flap 7 and the bottom attachment flap 8 as shown in FIG. 9. Once the elongated pole is inserted through the at least one pole-retaining channel 12 of the top attachment flap 7 and the bottom attachment flap 8, the top attachment flap 7 and the bottom attachment flap 8 fold outward and create an obtuse angle with the rear surface 2 thus applying friction between the elongated pole and the present invention to maintain a stationary position.

In reference to FIG. 3, the shapes of the top attachment flap 7 and the bottom attachment flap 8 are defined by the main body 9 as the main body 9 is delineated by the distal edge 10 and connector edge 11. For example, when the main body 9 is shaped into a semi-circular body, the diameter becomes the connector edge 11 and the arc length becomes the distal edge 10. However, the actual shape of the main body 9 can be any geometric shape without deviating from the scope of the functionality.

Figure 4:
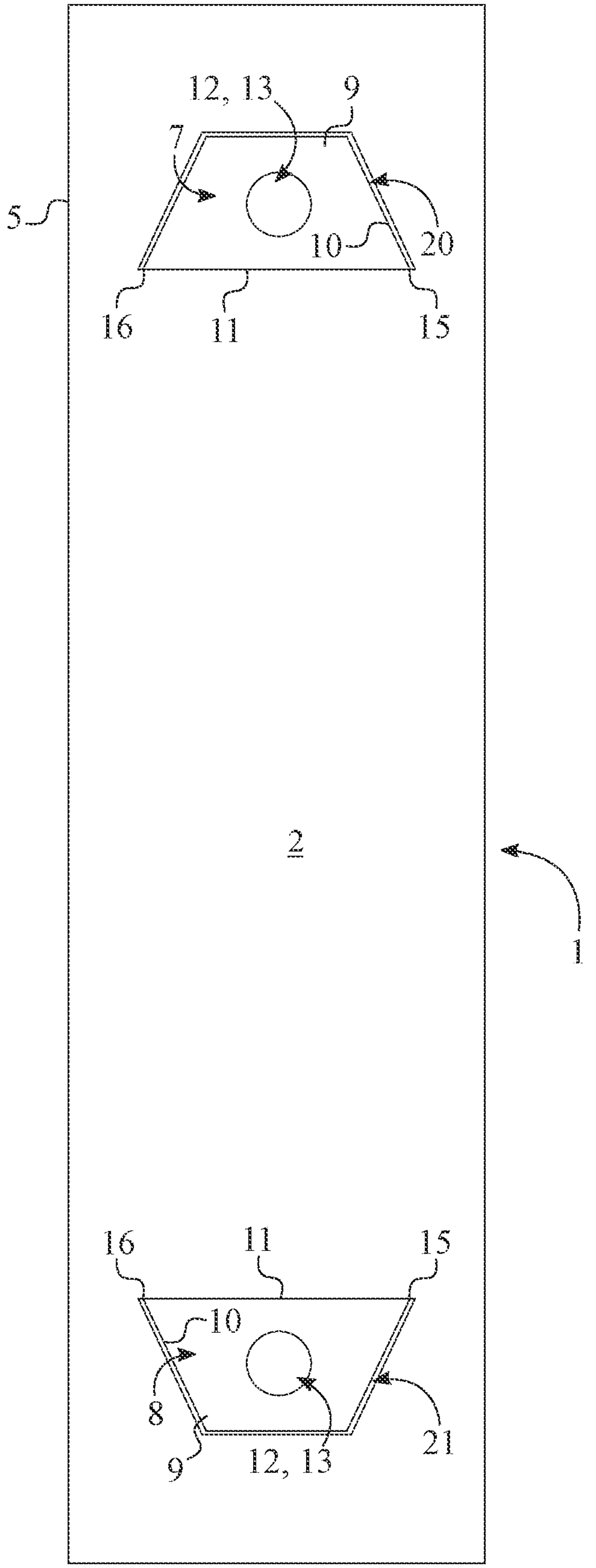
FIG. 4 is a rear view of the first configuration of the present invention, showing the top opening and the bottom opening.

In reference to FIG. 3, FIG. 4, and FIG. 6, the at least one pole-retaining channel 12 comprises a center channel 13 thus allowing a single elongated pole to be inserted. More specifically, the center channel 13 is concentrically positioned within the main body 9 and traverses through the main body 9. As a result, the support panel 1 can be symmetrically balanced around the single elongated pole when inserted through the center channel 13. The center channel 13 can be integrated into the first configuration and the second configuration of the present invention without deviating from the scope of the functionality.

Figure 5:
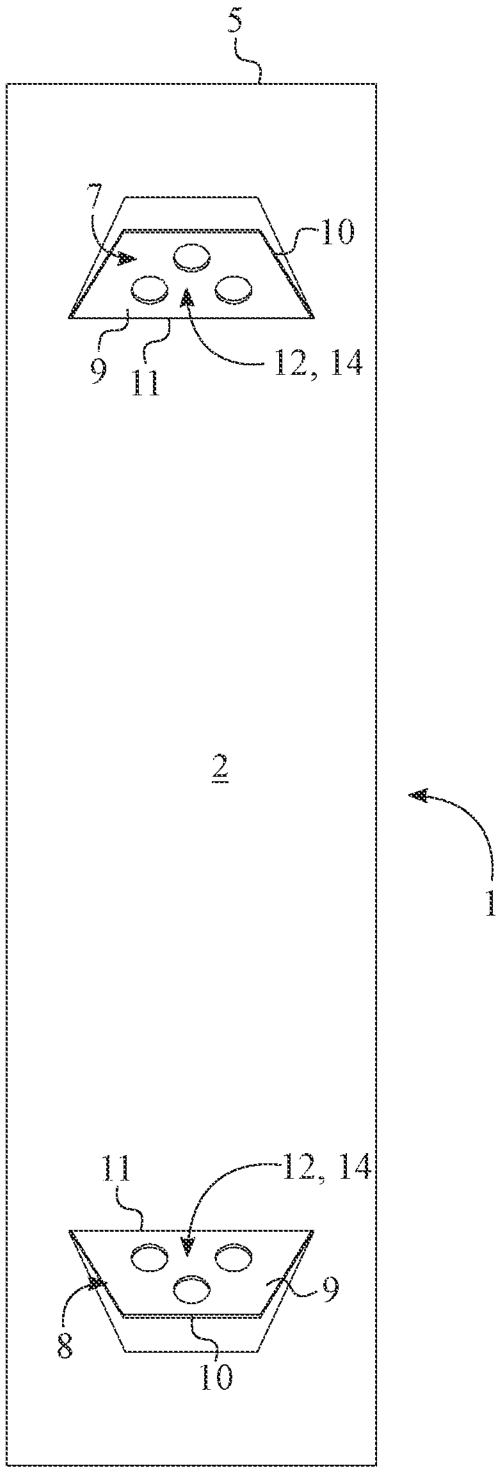
FIG. 5 is a rear view of the first configuration of the present invention, showing the plurality of channels of the least one pole-retaining channel.
Figure 7:
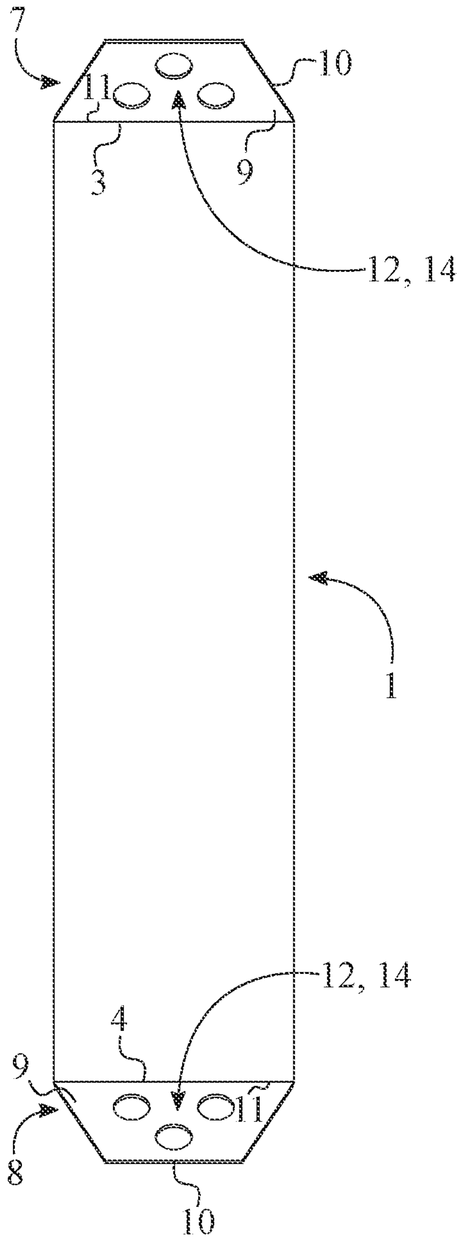
FIG. 7 is a rear view of the second configuration of the present invention, showing the plurality of channels of the at least one pole-retaining channel.

In reference to FIG. 5 and FIG. 7, the at least one pole-retaining channel 12 comprises a plurality of channels 14 thus allowing multiple elongated poles to be inserted. More specifically, the plurality of channels 14 is positioned within the distal edge 10 and the connector edge 11 as the plurality of channels 14 traverses through the main body 9. As a result, the support panel 1 can be symmetrically balanced around the multiple elongated poles when inserted through the plurality of channels 14. The plurality of channels 14 can be integrated into the first configuration and the second configuration of the present invention without deviating from the scope of the functionality.

Figure 10:
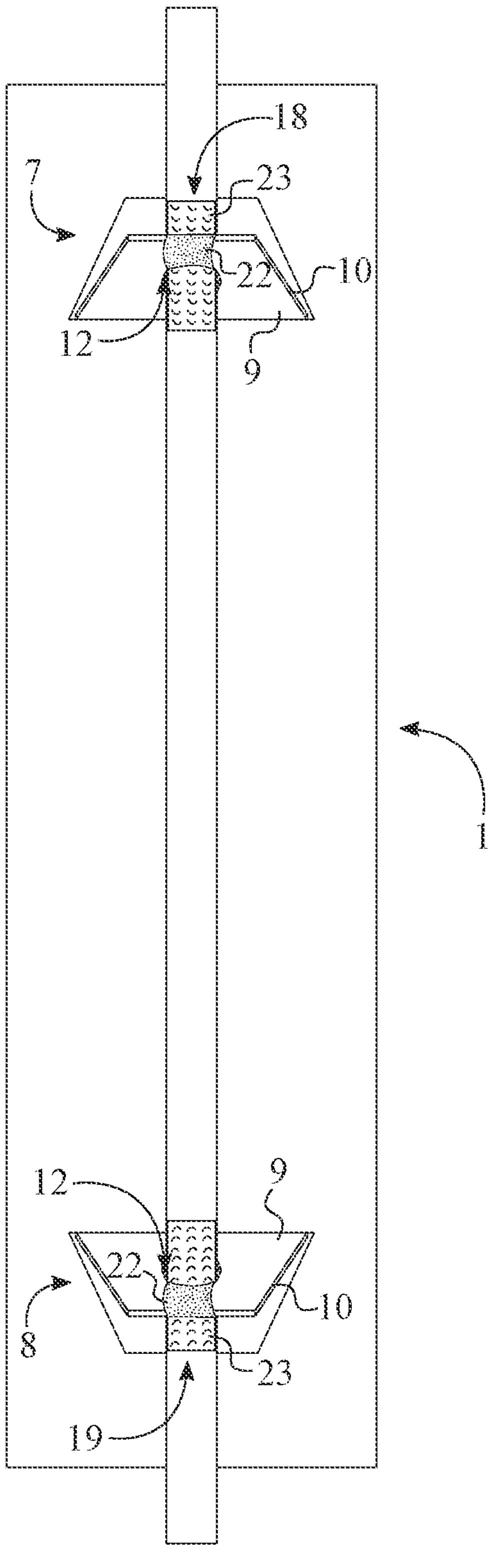
FIG. 10 is a rear view of the first configuration of the present invention, showing an elongated pole inserted through the at least one pole-retaining channel of the top attachment flap and the bottom attachment flap, and also showing the first embodiment for the top fastening mechanism and the bottom fastening mechanism.
Figure 11:
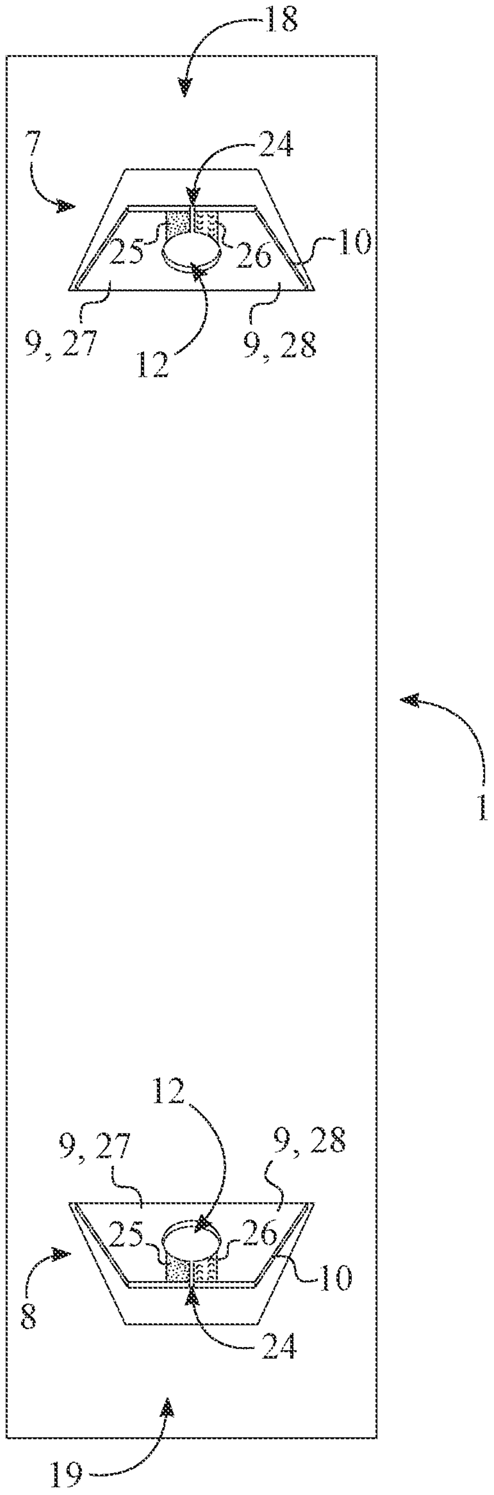
FIG. 11 is a rear view of the first configuration of the present invention, showing the second embodiment for the top fastening mechanism and the bottom fastening mechanism.

In reference to FIG. 10 and FIG. 11, the present invention further comprises a top fastening mechanism 18. More specifically, the top fastening mechanism 18 is connected to the main body 9 of the top attachment flap 7 and positioned adjacent to the distal edge 10 and the at least one pole-retaining channel 12 of the top attachment flap 7. The top fastening mechanism 18 functions as a mounting body between the present invention and the elongated pole so that the present invention can be removably mounted to the elongated pole.

In reference to FIG. 10 and FIG. 11, the present invention further comprises a bottom fastening mechanism 19. More specifically, the bottom fastening mechanism 19 is connected to the main body 9 of the bottom attachment flap 8 and positioned adjacent to the distal edge 10 and the at least one pole-retaining channel 12 of the bottom attachment flap 8. The bottom fastening mechanism 19 functions as a mounting body between the present invention and the elongated pole so that the present invention can be removably mounted to the elongated pole.

In reference to FIG. 10, a first embodiment of the top fastening mechanism 18 and the bottom fastening mechanism 19 each comprises a first interlocking fastener 22 and a second interlocking fastener 23. The first interlocking fastener 22 is looped around the distal edge and the at least one pole-retaining channel 12. The second interlocking fastener 23 is removably mounted to the first interlocking fastener 22. Preferably, a hook and loop fastener is utilized as the top fastening mechanism 18 and the bottom fastening mechanism 19; however, any other types of quick detachable fasteners can be utilized as the top fastening mechanism 18 and the bottom fastening mechanism 19. For example, the first interlocking fastener 22 of the hook and loop fastener is connected to the top attachment flap 7 and the bottom fastening mechanism 19. The second interlocking fastener 23 of the hook and loop fastener is connected to the elongated pole. As a result, when the elongated pole is inserted into the at least one pole-retaining channel 12 of the top attachment flap 7 and the bottom fastening mechanism 19, the first interlocking fastener 22 and the second interlocking fastener 23 are able to attach to each other.

In reference to FIG. 11, a second embodiment of the top fastening mechanism 18 and the bottom fastening mechanism 19 each comprises a first interlocking fastener 25, a second interlocking fastener 26, a slit 24, a left half 27, and a right half 28. The slit 24 traverses from the distal edge to the at least one pole-retaining channel 12, wherein the main body is delineated into the left half 27 and the right half 28 by the slit 24. The first interlocking fastener 25 is connected to the left half 27 and positioned adjacent to the slit 24. The second interlocking fastener 26 is connected to the right half 28 and positioned adjacent to the slit 24. As a result, the slit 24 of the top fastening mechanism 18 enables the at least one pole-retaining channel 12 to be separated and placed around a positionally-fixed elongated pole at any point along the length of the pole rather than having to insert and end of the pole into the at least one pole-retaining channel 12. The slit 24 of the top fastening mechanism 18 allows the user to secure a display item onto an elongated pole that may be secured in place from floor-to-ceiling, such as in an art studio. Preferably, a hook and loop fastener is utilized as the top fastening mechanism 18 and the bottom fastening mechanism 19; however, any other types of quick detachable fasteners can be utilized as the top fastening mechanism 18 and the bottom fastening mechanism 19. For example, the first interlocking fastener 25 of the hook and loop fastener is connected to the left half 27 of the top fastening mechanism 18 and the bottom fastening mechanism 19. The second interlocking fastener 26 of the hook and loop fastener is connected to the right half 28 of the top fastening mechanism 18 and the bottom fastening mechanism 19. As a result, the present invention can be placed around a positionally-fixed elongated pole as the at least one pole-retaining channel 12 of the top attachment flap 7 and the bottom fastening mechanism 19 are accessed through the slit 24, Then, the user can easily close the at least one pole-retaining channel 12 of the top attachment flap 7 and the bottom fastening mechanism 19 via the first interlocking fastener 25 and the second interlocking fastener 26.

When the present invention is mounted to the support structure such as wall, window, or other structure components, the front surface of the support panel 1 is adhered or mounted to a flat surface area of the support structure thus allowing the user to access the at least one pole attachment 6. Resultantly, the user can then insert and secure an elongated pole with display into the at least one pole attachment 6.

Although the invention has been explained in relation to its preferred embodiment, it is to be understood that many other possible modifications and variations can be made without departing from the spirit and scope of the invention as hereinafter claimed.

What is claimed is:

1. A bracket apparatus for pole mounting and sign display comprising:
- a support panel;
- at least one pole attachment;
- the support panel comprising an outer edge, a top opening, and a bottom opening;
- the at least one pole attachment comprising a top attachment flap and a bottom attachment flap;
- the top attachment flap and the bottom attachment flap each comprising a main body, a distal edge, a connector edge, and at least one pole-retaining channel;
- the support panel being configured to anchor onto a support structure;
- the at least one pole attachment being configured to attach onto a vertically-oriented pole;
- the support panel being configured to be positioned in between the support structure and the vertically-oriented pole;
- the at least one pole attachment being foldably integrated to the support panel;
- the main body of the top attachment flap being foldably connected to the support panel along the connector edge of the top attachment flap;
- the main body of the bottom attachment flap being foldably connected to the support panel along the connector edge of the bottom attachment flap;
- the connector edge of the top attachment flap and the connector edge of the bottom attachment flap being linearly offset from each other;

an acute angle between the top attachment flap and the support panel and an acute angle between the bottom attachment flap and the support panel being oriented in opposite directions to each other;

the at least one pole-retaining channel traversing through the main body;

the at least one pole-retaining channel being positioned within the distal edge and the connector edge;

the at least one pole-retaining channel of the top attachment flap and the at least one pole-retaining channel of the bottom attachment flap being positioned concentric to each other;

the at least one pole-retaining channel of the top attachment flap and the at least one pole-retaining channel of the bottom attachment flap being configured to simultaneously receive the vertically-oriented pole;

the at least one pole-retaining channel of the top attachment flap being a top pole-retaining circular hole;

a circumference of the top pole-retaining circular hole being equal to a circumference of an annular lateral surface of the vertically-oriented pole;

the at least one pole-retaining channel of the bottom attachment flap being a bottom pole-retaining circular hole;

a circumference of the bottom pole-retaining circular hole being equal to a circumference of the annular lateral surface of the vertically-oriented pole;

the vertically-oriented pole being frictionally held in place between the top pole-retaining circular hole and the bottom pole-retaining circular hole without supporting a bottom end of the vertically-oriented pole;

the top opening traversing through the support panel;

the distal edge of the top attachment flap being delineated by the top opening;

the connector edge of the top attachment flap being linearly extended from a left end of the distal edge to a right end of the distal edge;

the distal edge of the top attachment flap being coextensive with a free edge of the top opening;

the distal edge of the bottom attachment flap being delineated by the bottom opening;

the connector edge of the bottom attachment flap being linearly delineated from a left end of the distal edge to a right end of the distal edge;

the distal edge of the bottom attachment flap being coextensive with a free edge of the bottom opening;

the top opening and the bottom opening being linearly offset from each other;

the top attachment flap being foldably positioned within the outer edge; and the bottom attachment flap being foldably positioned within the outer edge.

2. The bracket apparatus for pole mounting and sign display as claimed in claim 1 comprising:

the support panel comprising a top edge and a bottom edge;

the top edge being positioned parallel to the bottom edge;

the top attachment flap being adjacently positioned to the top edge;

the connector edge of the top attachment flap being foldably connected to the top edge;

the distal edge of the top attachment flap being externally positioned to the top edge;

the bottom attachment flap being adjacently positioned to the bottom edge;

the connector edge of the bottom attachment flap being foldably connected to the bottom edge; and the distal edge of the bottom attachment flap being externally positioned to the bottom edge.

3. The bracket apparatus for pole mounting and sign display as claimed in claim 1, wherein the main body being delineated by the distal edge and the connector edge.

4. The bracket apparatus for pole mounting and sign display as claimed in claim 3 comprising:

the at least one pole-retaining channel comprising a center channel;

the center channel being concentrically positioned within the main body; and the center channel traversing through the main body.

5. The bracket apparatus for pole mounting and sign display as claimed in claim 3 comprising:

the at least one pole-retaining channel comprising a plurality of channels;

the plurality of channels being positioned within the distal edge and the connector edge; and the plurality of channels traversing through the main body.

6. The bracket apparatus for pole mounting and sign display as claimed in claim 1 comprising:

a top fastening mechanism;

the top fastening mechanism being connected to the main body of the top attachment flap; and the top fastening mechanism being positioned adjacent to the distal edge and the at least one pole-retaining channel of the top attachment flap.

7. The bracket apparatus for pole mounting and sign display as claimed in claim 1 comprising:

a bottom fastening mechanism;

the bottom fastening mechanism being connected to the main body of the bottom attachment flap; and the bottom fastening mechanism being positioned adjacent to the distal edge and the at least one pole-retaining channel of the bottom attachment flap.

8. The bracket apparatus for pole mounting and sign display as claimed in claim 1 comprising:

a top fastening mechanism;

a bottom fastening mechanism;

the top fastening mechanism and the bottom fastening mechanism each comprising a first interlocking fastener and a second interlocking fastener;

the first interlocking fastener being looped around the distal edge and the at least one pole-retaining channel; and the second interlocking fastener being removably mounted to the first interlocking fastener.

9. The bracket apparatus for pole mounting and sign display as claimed in claim 1 comprising:

a top fastening mechanism;

a bottom fastening mechanism;

the top fastening mechanism and the bottom fastening mechanism each comprising a first interlocking fastener, a second interlocking fastener, a slit, a left half, and a right half;

the slit traversing from the distal edge to the at least one pole-retaining channel;

the main body being delineate into the left half and the right half by the slit;

the first interlocking fastener being connected to the left half;

the first interlocking fastener being positioned adjacent to the slit;

the second interlocking fastener being connected to the right half; and the second interlocking fastener being positioned adjacent to the slit.

* * * * *